Nov. 1, 1955 J. M. CLUWEN ET AL 2,722,617

MAGNETIC CIRCUITS AND DEVICES

Filed Nov. 19, 1952 4 Sheets-Sheet 1

INVENTORS
JOHANNES MEYER CLUWEN,
ADRIAAN RADEMAKERS,
GERHART WOLFGANG RATHENAU
JAN SMIT

BY Fred M Vogel
AGENT

MAGNETIC CIRCUITS AND DEVICES

Filed Nov. 19, 1952 4 Sheets-Sheet 2

INVENTORS

JOHANNES MEYER CLUWEN,
ADRIAAN RADEMAKERS,
GERHART WOLFGANG RATHENAU,
JAN SMIT

BY [signature] AGENT

MAGNETIC CIRCUITS AND DEVICES

Filed Nov. 19, 1952 4 Sheets-Sheet 3

INVENTORS
JOHANNES MEYER CLUWEN,
ADRIAAN RADEMAKERS,
GERHART WOLFGANG RATHENAU,
JAN SMIT

BY Fred M Vogel
AGENT

INVENTORS
JOHANNES MEYER CLUWEN,
ADRIAAN RADEMAKERS,
GERHART WOLFGANG RATHENAU,
JAN SMIT

BY Fred M Vogel AGENT

Patented Nov. 1, 1955

2,722,617

MAGNETIC CIRCUITS AND DEVICES

Johannes Meyer Cluwen, Adriaan Rademakers, Gerhart Wolfgang Rathenau, and Jan Smit, Eindhoven, Netherlands, assignors to Hartford National Bank & Trust Company, Hartford, Conn., as trustee Application November 19, 1952, Serial No. 321,304

Claims priority, application Netherlands November 28, 1951

27 Claims. (Cl. 310—103)

This invention relates to magnetic devices and in particular to magnetic devices comprising one or more magnetic circuits having permanent magnetic material for producing a permanent magnetic field in opposite directions.

Devices of the foregoing type have wide application in different branches of engineering, for example, such devices can produce the energizing field for an electrical multipole machine, for example, an electric motor or an electric dynamo, and in order to drive such a machine at high frequencies or at a low rate of speed, it is preferable that a large number of poles are provided. Another illustration of an apparatus employing the foregoing device is a tape recorder in which the tape is passed over the magnetic device, the permanent magnetic field changing alternately the polarization of the tape with steadily decreasing field strength, so that it erases the intelligence recorded on the tape. The dimensions of such an erasing head are determined not only by the number and the dimensions of the poles of the device, but also by their intermediate spacings. A further use for such a device is for mechanically coupling the fields of two of such magnetic circuits so that they act upon one another, whereby a relative displacement of the two circuits results in a force directed opposite to this displacement so that a mechanical motion of one circuit (the driving mechanism) is transmitted to the other circuit (driven mechanism). In accordance with the concept underlying the invention, which will be explained more fully hereinafter, an appreciable maximum driving force is capable of producing an appreciable maximum driving torque, particularly in the case of rotating mechanisms when use is made of a small volume of material, by greatly increasing the number of magnetic poles of the device.

In all of the examples described above a magnetic circuit comprising a large number of poles is required for a given length of pitch line along the pole faces, either for increasing the frequency or decreasing the speed of revolution with multipolar machines, or, with an erasing head, to reduce the dimensions to low values, or, with mechanical coupling, to obtain a small volume of the material to be used.

The main object of the invention is to provide magnetic circuits having a large number of poles in a given length of the pitch line.

According to the invention, a magnetic device comprising permanent magnetic material for producing a permanent magnetic field varying in direction along a given pitch line comprises a plurality of magnetic poles each having a pitch length $s$ along the face thereof. The spacing $x$ between adjacent magnetic poles measured along the pitch line and the thickness $d$ of the permanent magnetic material constituting the poles measured in the direction of magnetization is adjusted so as to have values at which $x$ is smaller than $0.7s$ and smaller than $2d$ and $d$ lies in the range between $0.15s$ and $s$. The permanent magnetic material constituting the poles is chosen to have a remanence inductance $B_r$ in Gauss not greater than four times the coercive field strength ${}_bH_c$ in Oersted.

The invention will now be described with reference to the accompanying drawing in which:

Figs. 16, 17 and 18 show, respectively, variants of the device shown in Fig. 15;

Fig. 19 shows a modification of the device shown in Fig. 14;

Figs. 20 and 21A show variants of the device shown in Fig. 14 in which a transmission ratio differing from 1 is obtained;

Fig. 21B is a side view of Fig. 21*a*;

Figs. 22A and 23A show devices according to the invention for the transmission of a rotating movement in which the axes of rotation are at an angle to one another;

Figs. 22B and 23B are side views, respectively, of Figs. 22A and 23A;

Fig. 27A shows a device according to the invention for obtaining a transmission ratio which is low with respect to 1;

Fig. 27B is a side view of Fig. 27A;

Figures 1, 2, 3, 4, 5, 6, 7, 8, 9, 10, 11, 12:
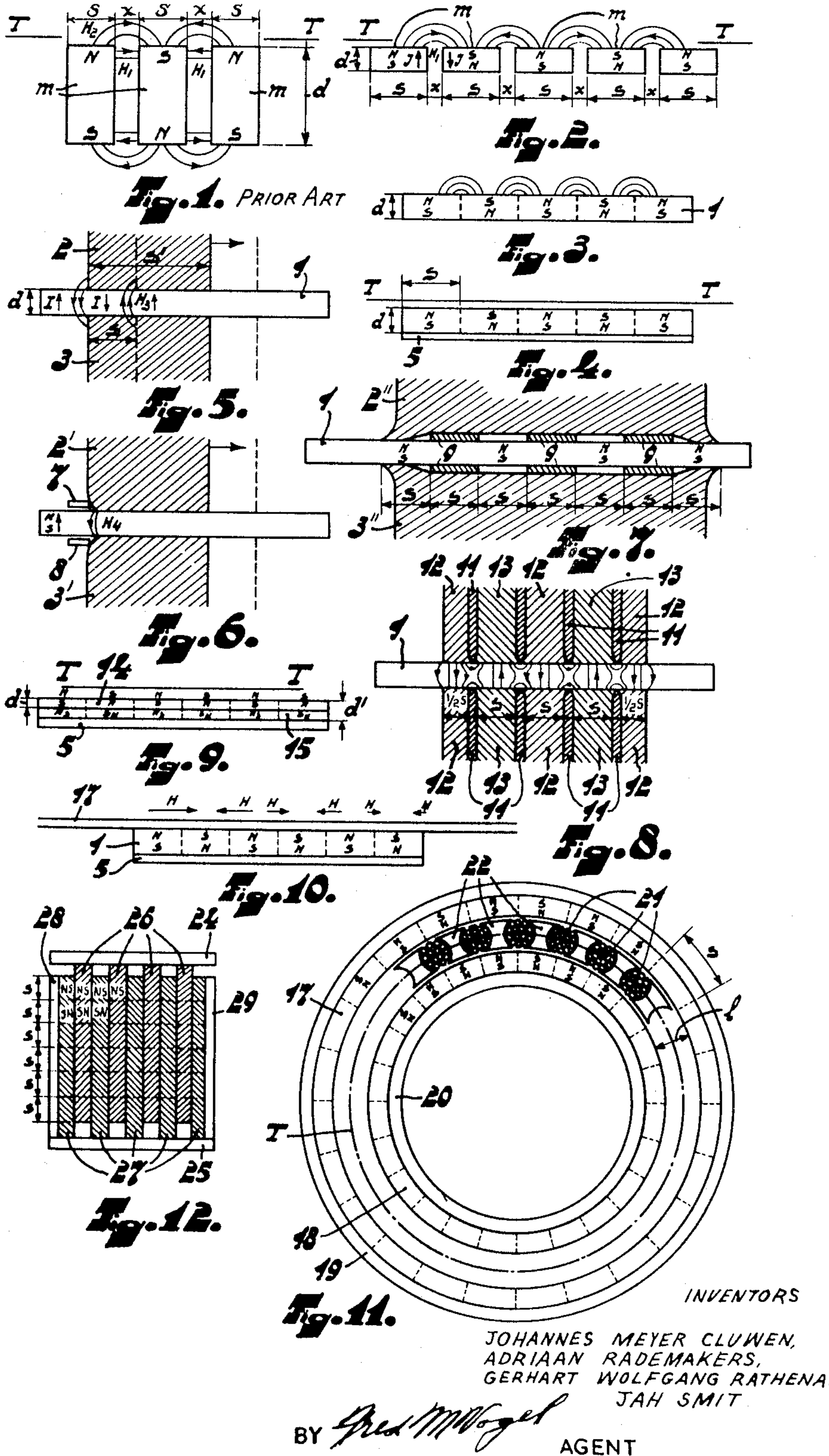
FIG. 1. PRIOR ART, FIG. 2., FIG. 3., FIG. 4., FIG. 5., FIG. 6., FIG. 7., FIG. 8., FIG. 9., FIG. 10., FIG. 11., FIG. 12.
Fig. 1 shows the lines of force of a known magnetic circuit.
Fig. 2 shows a device according to the invention comprising a number of distinct magnets.
Fig. 3 shows a device according to the invention constituted by a single body of permanent magnetic material.
Fig. 4 shows a modification of the device shown in Fig. 3.
Figs. 5, 6, 7 and 8 show different magnetizing apparatus for providing the poles in the device shown in Fig. 3.
Fig. 9 shows a further modification of the devices shown in Figs. 3 and 4.
Fig. 10 shows a device according to the invention used for erasing the intelligence recorded on a magnetophone tape.
Fig. 11 shows a device according to the invention for use in an electrical multipole machine.
Fig. 12 shows a device according to the invention for resilient coupling of two component parts.

Fig. 1 shows a known device comprising a number of permanent magnets $m$ spaced apart from one another by a distance $x$, the magnetizations NS of these magnets having alternately different directions so that a permanent magnetic field is produced, the directions of which, measured along a pitch line T, alternate with one another. The magnets $m$ are made of conventional permanent magnetic material having a comparatively high value of the product of $(BH)_{max}$, where B designates the inductance and H the magnetic field strength, $(BH)_{max}$ designating the maximum value of the product of B and H. The thickness $d$ of the magnets $m$, measured in the direction of magnetization NS, is in such a case, comparatively large with respect to the surface dimensions of the magnet, and in particular, the pitch length $s$ of the poles measured along the pitch line T. In this known device, it is conventional to choose a magnetic material with a large $(BH)_{max}$ to ensure that the volume of required magnetic material is a minimum for a given value of flux emanating from the pole surface; however, the thickness $d$ generally being required to be about 4 times the pitch length $s$.

The invention is based on the discovery that by choosing a permanent magnetic material having a considerably lower value of $(BH)_{max}$ and further having a ratio between the remanent inductance $B_r$ in Gauss and the coercive field strength ${}_BH_c$ in Oersteds which is not greater than 4, and by arranging the magnetic poles so that they are spaced apart a comparatively small distance, i. e. less than 0.7 times the pitch length $s$ of the pole face, the field emanating from the pole surface was found to be approximately the same as that emanating from the known arrangement shown in Fig. 1, with the additional advantage, however, that the thickness $d$ of the magnet was materially reduced, i. e. a thickness $d$ of about ⅓ of the pitch length $s$ being sufficient.

Consequently, in spite of the much lower value of $(BH)_{max}$, the devices according to the invention are found to yield an economy in material by a factor of about 10. Moreover, this gives the important advantage that the magnetic circuit may be made of a thin permanent magnetic body without distinct poles, in which the magnet poles are magnetized in the direction of the thickness.

The advantages obtainable with the devices according to the invention may be accounted for as follows. Fields having lines of force, as shown in Fig. 1, are produced between the magnets $m$ having concentrated magnetic charges at their pole surfaces N and S. If the spacing $x$ between the poles is small, i. e. smaller than 0.7 times the pitch length $s$ and smaller than twice the thickness $d$ of the poles, the transverse fields $H_1$ between the side surfaces of the magnets $m$ will assume very high values, due to the low internal reluctance of the permanent magnet material; these values may even exceed the field strength of disappearance ${}_IH_c$ (i. e. the field strength at which the magnetization I becomes equal to zero), as a result of which the magnetization diverges locally from the initial direction of magnetization NS. Consequently, because of the low internal reluctance of this magnetic material and because of the resultant change of direction of the magnetization I, the effective field $H_2$ emanating from the pole surfaces N and S of the magnets is materially attenuated.

These two effects are greatly reduced if use is made of a permanent magnetic material having a ratio between the remanent inductance $B_r$ (in Gauss) and the coercive field strength ${}_BHc$ (in Oersted) thereof which is low, i. e. smaller than 4, since due to the lower value of the remanent inductance $B_r$, the strength of the magnetic charges produced at the pole surfaces N and S decreases and, hence, the strength of the transverse field $H_1$, and moreover, due to the higher value of the coercive field strength ${}_BH_c$, the magnetization I changes in direction with greater difficulty.

This higher coercive field strength ${}_BH_c$, which is preferably more than 750 Oersteds, also permits reducing the thickness $d$ of the material to a greater extent. The thickness $d$ is chosen between $s$ and $0.15s$, preferably approximately equal to $\frac{1}{2}s$, wherein $s$ designates the pitch length, because a greater thickness than $s$ does not materially contribute to the effective field $H_2$, whereas with a smaller thickness than $0.15s$, there could not be obtained a large number of poles in a given length of the pitch line T.

A device according to the invention is shown in Fig. 2. Between the successive pole surfaces N and S of the magnets $m$ are produced the lines of force shown in the figure, concentrated to the greatest density at the edges between the pole surfaces. The field strength $H_1$ corresponding to this maximum flux concentration may be increased to a high value by arranging the magnets so that they abut one another, i. e. reducing the spacing $x$ to zero. However, by using separate magnets as shown in Fig. 2, the transition zone within which the magnetization I of one magnet meshes with that of the other magnet may be minimized.

On the other hand, the small thickness $d$ required of the magnet makes possible a construction of the magnet circuit from a single body 1 of permanent magnetic material as shown in Fig. 3, in which the poles are introduced with alternating magnetization directions N—S. This body 1 does not have distinct poles in order to simplify the manufacture, i. e. on the outer surface of the body no poles are visible. The manufacture of such a body is frequently simpler than the construction of the magnetic circuit from a large number of separate magnets as shown in Fig. 2.

Due to the small thickness $d$ of the magnet with respect to the pitch length $s$ of the magnet poles, the demagnetizing field of the magnets may become rather strong. By magnetically connecting the magnet poles formed on the side remote from the pitch line T by means of a body 5 of ferromagnetic material, as shown in Fig. 4, the thickness of the material is effectively doubled so that the field strength produced may be increased slightly, for example, by about 10%.

Fig. 5 shows a magnetizing device for producing the poles in the permanent magnetic body 1 shown in Fig. 3 comprising two poleshoes 2 and 3 of ferromagnetic material between which the body 1 is introduced. A magnetization I in one direction is induced in the body 1 primarily through a length $s'$, equal to that of the poleshoes 2 and 3, after which the polarization device is shifted in the direction of the arrow with respect to the body 1 through a distance equal to the pitch length $s$ of the poles, the device then taking up the position shown in broken lines, after which the next part of the body 1 is magnetized in opposite direction. With such a technique, at least portions of the material must be demagnetized from one direction of magnetization to the opposite direction. By choosing the length $s'$ of the polarization poleshoes 2, 3 to be equal to the pitch length $s$ of the poles, a slightly lower polarization field strength may be sufficient.

The polarizing field required exhibits stray fields at the edges, as indicated by $H_3$, which more or less neutralizes locally the magnetization previously produced in the body. If, for example, the polarizing field strength is assumed to be equal to one and a half times the field strength of disappearance ${}_IH_c$ of the permanent magnetic material of the body 1, an adequate magnetization in the center of the pole surface is produced, except for the edges, over a width approximately equal to half the thickness $d$. Consequently, the material will be partly demagnetized so that the transition zone, within which the magnetization I of two adjacent poles changes its direction, increases and the maximum field strength obtained is reduced. The pitch length $s$ must then be made approximately equal to twice the thickness $d$ of the material.

Fig. 6 shows how the deleterious effects of the above-described demagnetization may be reduced. By suitable choice of the shape of the polarizing poleshoes 2', 3' the field $H_4$ at the edges of the poleshoes is rendered slightly more parallel, and at the position of the beginning of the new pole surfaces it has exactly the strength required for satisfactory magnetization. In order to prevent the additional stray field from penetrating into the N—S poles already formed, a pulsatory polarizing field is used and near the N—S poles already formed are provided electrically good conductive non-ferromagnetic bodies 7 and 8 which, due to the eddy currents produced in them, prevent this pulsatory polarizing field from penetrating at the position of the poles already formed. The transition zone between two adjacent poles may then be reduced to less than ⅓ of the thickness *d* of the body.

In order to produce a large number of poles in the body 1 at the same time, use may be made of a polarizing device as is shown in Fig. 7 comprising two poleshoes 2″ and 3″, through which passes a pulsatory magnetic flux. In these poleshoes 2″, 3″ are provided conductive bodies 9 having a length and an intermediate spacing equal to the pitch length *s* of the poles to be produced. In these bodies 9 are induced eddy currents by the pulsatory magnetic field so that this magnetic field can penetrate only at the intermediate spacings, as shown by the poles N—S. By shifting the body 1 with respect to the polarizing device 2″, 3″ through a distance equal to the pitch length *s* and by polarizing in the opposite direction, the desired magnet circuit shown in Fig. 3 is obtained. By suitable choice of the shape of the poleshoes, a sharp transition of the magnetization I in the poles may be ensured.

Fig. 8 shows another polarizing device for the simultaneous introduction of a number of poles into the permanent magnetic body 1. In this case the poleshoes are constituted by a plurality of polarizing circuits 12 and 13, which are spaced from one another by electrically good conducting, non-ferromagnetic bodies 11, and which are traversed by a pulsatory flux in opposite senses. Consequently, within the permanent magnetic body 1 there is produced lines of force as shown in the figure, a sharp transition from one magnetization direction into the other being ensured at the position of the conductive bodies 11. By shifting the body 1 through a distance of an even plurality of the pitch length *s* relative to the polarizing device 12, 13, the poles may be produced in another part of the body. The poleshoe farthest to the left and that farthest to the right of the polarizing device need not be longer than about half the pitch length *s*, in which case the stray field of these poleshoes does not affect the poles already produced. With all these methods, starting with suitably chosen magnetic material, this material may be polarized at an increased temperature and a lower field strength in order to reduce the required polarizing field strength, the magnetization attaining the required value after cooling.

Since the transition zone between two adjacent poles varies greatly with the thickness *d* of the permanent magnetic body 1, it may be advantageous under particular conditions to construct the magnetic circuit, as shown in Fig. 9, from a number of stacked permanent magnetic bodies 14, 15 of the shape shown in Fig. 3, so that the total thickness *d′* of the magnetic circuit thus formed is a multiple of the thickness *d* of each of the separate bodies. The piling-up of the bodies 14 and 15 is simplified, since the poles produced in these bodies attract one another exactly in the desired manner. The poles on the side remote from the pitch line T may be connected magnetically to one another in the manner shown in Fig. 4 with the aid of the ferromagnetic body 5.

Fig. 10 shows a device according to the invention, for erasing the intelligence recorded on a magnetophone tape of a magnetic tape recorder. The magnetic circuit may, in this case, be identical with that shown in Fig. 4, with the modification, however, that the horizontal field strength component H decreases gradually in value at the transition from one pole to another, as shown in Fig. 10 by the lengths of the arrows. This may be provided by either gradually increasing the distances *x* between adjacent poles or by varying the magnetizing field so that the desired distribution of field strength is obtained. The greatest of these field strength components is preferably higher than 600 Oersteds. A magnetophone tape 17 guided over such a device will be magnetized by this field strength H alternately in one direction and in the other direction, so that the intelligence recorded on it will disappear. Under particular conditions it may be desirable to choose the pitch lengths *s* of the poles to differ in value. In a similar manner the undesired magnetization of the balance spring of a clock may be eliminated.

Fig. 11 shows a device according to the invention for producing the permanent magnetic field in an electrical multipole machine comprising two cylindrical magnetic circuits 17 and 18 of permanent magnetic material each having a coercive field strength $_BH_c$ of more than 750 Oersteds and a field strength of disappearance $_IH_c$ of preferably more than 1.2 $_BH_c$, the poles being provided in the material with a direction of magnetization N—S so that along a circular pitch line T there is obtained a magnetic field alternating in its direction. The poles on the side remote from the pitch line T of both circuits 17, 18 are connected magnetically to one another, respectively, by cylindrical ferromagnetic bodies 19 and 20. The circuits 17 and 18 rotate relatively to a magnetic winding 21 provided in cavities on a support 22, the current across the conductors in each winding 21 having opposite directions in two adjacent cavities of the support 22. If the spacing 1 between the two cylinders 17, 18 is small relative to the pitch length *s* of the poles, the stray field between two successive poles of each of the magnetic circuits 17 and 18 will be small, and in such a case the support 22 may be made from non-magnetic material increasing the serviceability of the device for higher frequencies. If, on the other hand, the said spacing 1 is of the same order as the pitch length *s*, it is preferable to make the support 22 of the magnetic winding 21 from ferromagnetic material.

Fig. 12 shows a device according to the invention for the resilient coupling of two component parts 24 and 25 comprising a number of identical permanent magnetic bodies 26 and 27 of the form shown in Fig. 3 stacked up and connected alternately to one part 24 and to the other part 25. The bodies 26 and 27 will tend to take up the position of equilibrium indicated in the figure, the magnetization directions NS in each row of poles being the same for these two bodies. For the sake of simplicity Fig. 12 shows only a few poles. If the parts 24 and 25 are moved farther from one another or nearer to one another, there will be produced a magnetic restoring force which is a resilient force, provided that the displacement remains smaller than half of the pitch width *s* of the poles. By providing a pair of ferromagnetic plates 28 and 29, which may also constribute to the mechanical rigidity of the device, the restoring force produced may be slightly increased.

Fig. 13A shows a device for the transmission of a mechanical movement from a driving mechanism to a driven mechanism, more particularly, a mechanical coupling between two mechanisms 31 and 32 rotating with the same speed. Each of these mechanisms 31 and 32 is provided with a disc-shaped magnetic circuit 33 and 34, respectively, of permanent magnetic material, in which, as shown in Fig. 13B, magnetic poles are provided on the facing pole surfaces 35 and 36, respectively. The directions of magnetization N—S are preferably arranged at right angles to the pole surfaces 35 and 36, and on the side remote from the pitch circle T of the magnetic circuits 33 and 34, the poles are connected magnetically to one another by means of ferromagnetic bodies 37 and 38, respectively. The magnetic circuits are separated from one another by an air gap 1, which may be reduced to zero so that the magnetic circuits abut each other. Alternatively, this air gap 1 may be replaced by a non-conductive, non-magnetic material, for example, a glass wall, in order to permit the transmission of a motion within a closed space. If the driving mechanism 31 is rotated, the poles at the surface 35 will exert a force on those of the surface 36, which tends to rotate the driven mechanism 32. In accordance with the concept underlying the invention, this force may be increased to a high value with a small volume of magnetic material by increasing the number of magnetic poles.

The maximum force exerted by two magnetic poles shifted in position relative to one another is, with a width b (measured at right angles to the pitch line and at right angles to the direction of magnetization of the poles) exceeding appreciably all other proportions d, s and l, substantially proportional to this width b and can be increased by increasing the pitch length s, the thickness d, and by decreasing the air gap 1. However, it has been found that, assuming the ptich length s and the thickness d to be at least a few times larger than the air gap 1, this maximum force can no longer be increased if the thickness d is made larger than twice the pitch length s. On the other hand, if the ratio between d and s is chosen to be constant at a value between 0.15 and 2, the force between two poles is approximately proportional to s. At a given length $\pi$D of the pitch circle T, wherein D designates the diameter thereof, the number of poles to be introduced becomes inversely proportional to the pitch length s. In such a case, therefore, the total force produced is substantially independent of the number of poles; however, the volume of material required is substantially reduced by using a large number of poles, since in this case the pitch length s is small and, hence, also the thickness d, which, in accordance with the foregoing, need not exceed 2s.

Due to the absence of distinct poles, the two pole surfaces 35 and 36 can slip past one another, which may be of importance in order to avoid overloading of the driving mechanism 31. However, the poles will also be relatively affected by their demagnetizing fields. In order to prevent a reduction of magnetization, the field strength of disappearance $_IH_c$ of the permanent magnetic material, in Oersted, should preferably exceed the remanent inductance $B_r$ in Gauss. By providing the mechanisms 31 and 32 with relatively engaging material poles, for example, high-permeable pole shoes of suitable shape which may slip in the case of a spacial displacement of the mechanisms produced by the relative forces between the poles, the maximum torque transmitted may be increased before slipping occurs.

If the driving mechanism 31 rotates and the mechanism 32 to be driven initially stands still, the required torque for starting the mechanism 32 may exceed the maximum torque required to provide the same speed for the latter as that of the driving mechanism, due to the mechanical inertia of the mechanism 32, e. g. the higher the number of poles at a correspondingly lower speed of rotation of the mechanism 31, the greater the tendency of the mechanical inertia to prevent the mechanism 32 from reaching its speed of rotation. For this purpose, the magnetic circuits 33 and 34 may be composed of separate magnets, which may be arranged at will N—S, N—S or N—N, S—S and, so on, side by side, so that the starting torque and the maximum torque obtainable may be varied. On the other hand, in order to cause the driven mechanism 32 to rotate with the same speed of rotation as the driving mechanism 31, a body, for example, a thin foil (not shown) of electrically good conductive material may be connected, in a known manner, to one of the two mechanisms; the movement of this foil relative to the poles of the other mechanism will induce eddy currents to flow through this foil so that the required driving torque is obtained. As an alternative, this foil body may be made of ferromagnetic material having high hysteresis losses caused by the said relative movement, so that the required driving torque is obtained in a different manner.

Figure 13:
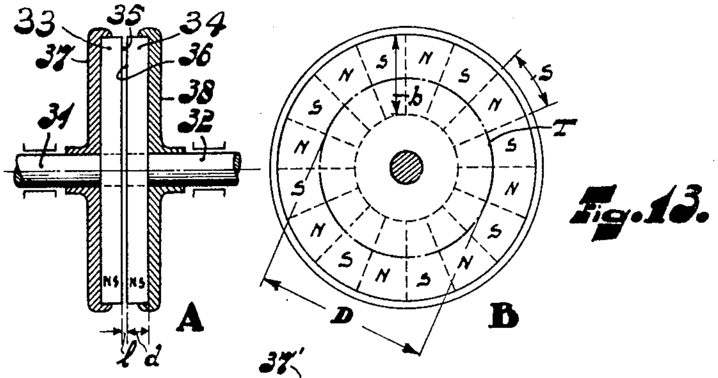
Figs. 13A and 14A show devices, respectively, according to the invention for the transmission of mechanical motion in which a rotating movement is transmitted without variation of the speed.
Figs. 13B and 14B are cross-sectional views, respectively, of Figs. 13A and 14A.

The device shown in Fig. 14A is a modification of the device shown in Fig. 13A in which the driving mechanism 31 comprises a cylindrical magnetic circuit 33' which co-operates with a concentric cylindrical magnetic circuit 34' of the driven mechanism 32. The permanent magnetic material in this embodiment is used more efficiently to obtain a large driving torque because the parts of the magnetic circuits 33 and 34 near the axis (Fig. 13) contribute only little to this torque. Furthermore, as shown in Fig. 14B, the pitch length s is comparatively small so that for the same driving force or the same driving torque a minimum quantity of magnetic material is required. A foil 40 of good conductive material serves to improve the driving as described in the preceding paragraph.

Fig. 15A shows a further modification of the device shown in Fig. 13A in which the speed of rotation of the driven mechanism relative to that of the driving mechanism has a transmission ratio different than 1. In this cases, the use of magnetic circuits having a large number of poles and a given length of the pitch line provides a great variety of transmission ratios. The pitch lengths of the poles of the magnetic circuits need not be exactly equal to one another, as is the case with mechanical gears, but may differ up to about 20% with satisfactory operation. The driving force obtainable from this embodiment is appreciably smaller than that obtainable from the device shown in Fig. 13 since the number of co-operating poles of the two magnetic circuits is only a fraction of that of the device shown in Fig. 13, and since part of the driving force is neutralized, because at the positions A and B of Fig. 15B poles of equal polarity are opposite one another. However, the latter drawback may be obviated by avoiding narrow contact between the magnet poles N and S and, as is shown in Fig. 16, by providing non-polarized zones C between these magnet poles. As is evident from Fig. 16, these zones C must become wider from the pitch circle to the outside.

Figures 17, 18, 19, 20, 21, 22:
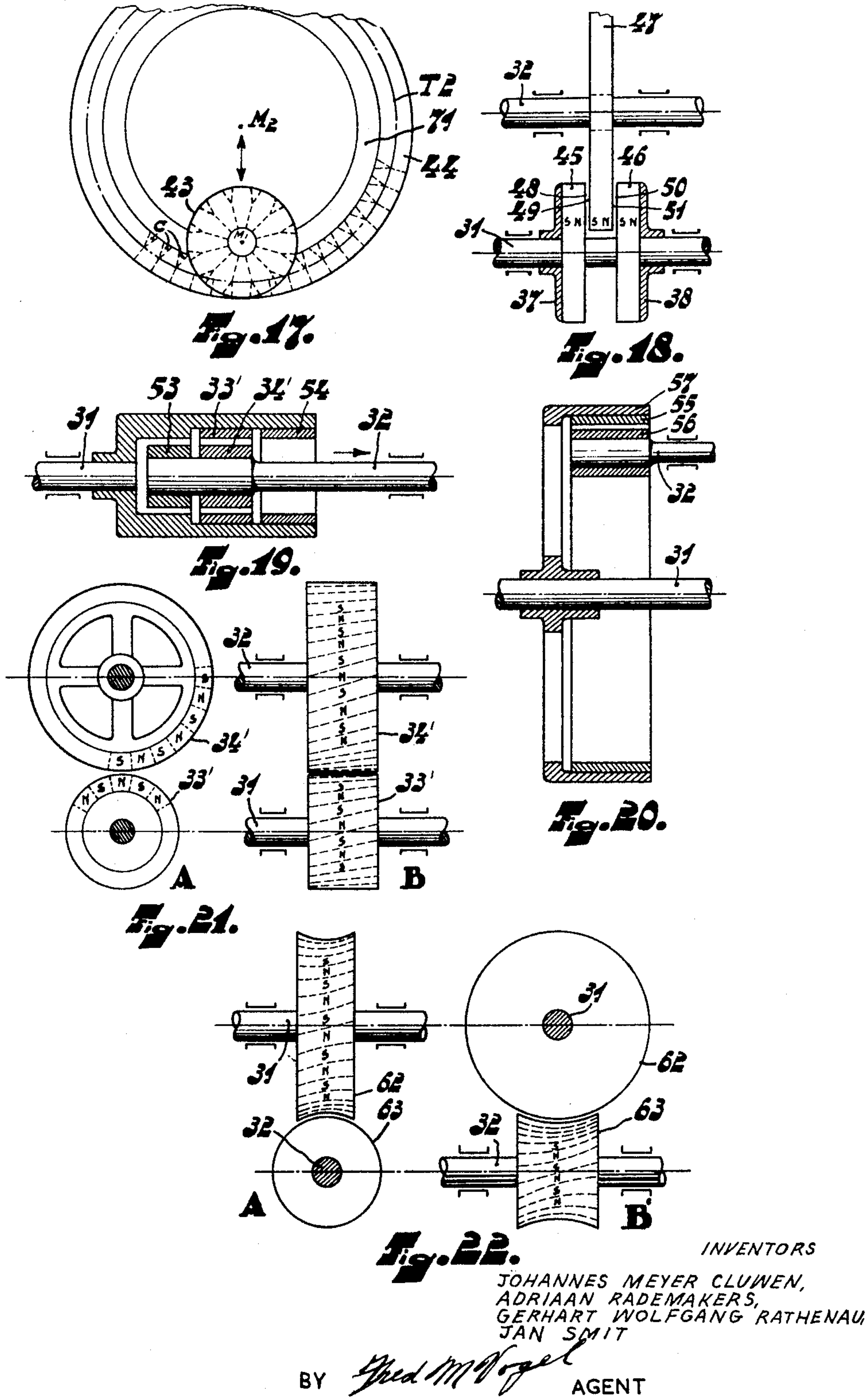

Fig. 17 shows a modification of the device shown in Fig. 15A in which the center $M_1$ of one mechanism 43 lies within the pitch circle $T_2$ of the other mechanism 44. In such a case, the largest width of the non-polarized zones C of the latter mechanism 44 must be directed towards its center $M_2$.

Figure 15:
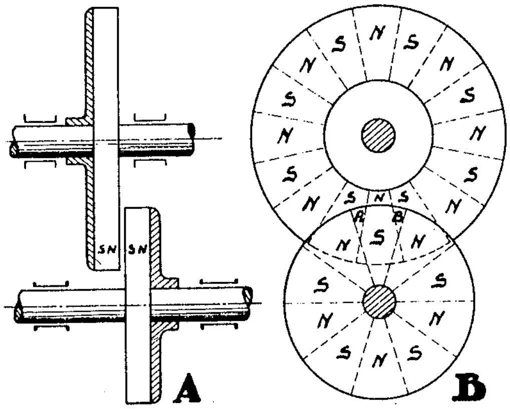
Fig. 15A shows a modification of the device shown in Fig. 13 in which a transmission ratio differing from 1 is obtained.
Fig. 15B is a cross-sectional view of Fig. 15A.
Figure 16:
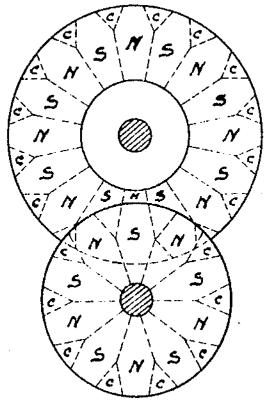

Fig. 18 shows still a further modification of the device shown in Fig. 15 in which an appreciable increase in driving force is obtained by providing the mechanisms 31 and 32 with a number of disc-shaped magnetic circuits 45, 46, 47, in which all the poles are magnetized in an axial direction NS so that a plurality of facing pairs of pole surfaces 48—49, 50—51 of the magnetic circuits co-operate with one another. The ferromagnetic bodies 37 and 38 embracing, respectively, the magnetic circuits 45, 46 increase to a certain extent the magnetic fields produced and, hence, the driving torque. Moreover, since one of the mechanisms 31 contains one magnetic circuit more than the other mechanism 32, this device has the advantage that the axial component of the attractive force between the magnetitc circuits 48—49 and 50—51 compensate one another to a great extent. For decoupling purposes, a conductive body (not shown), serving as a magnetic brake, may be arranged in the proximity of the magnetic circuit 47.

Figures 23, 24, 25, 26, 27, 28:
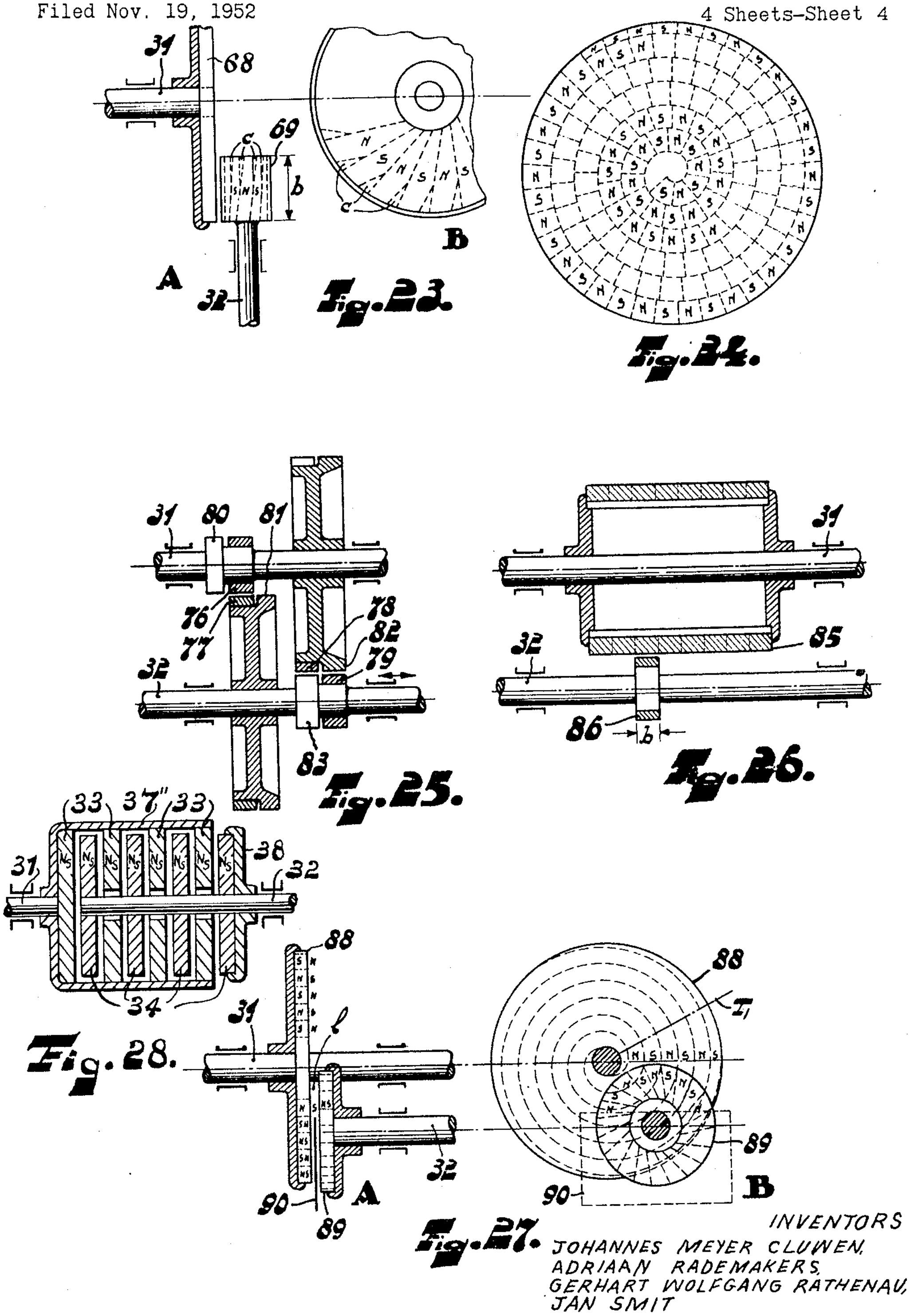
Figs. 24, 25 and 26 show devices according to the invention for varying the transmission ratio.
Fig. 28 shows a modification of the device illustrated in Fig. 13.

In a similar way as described with reference to Fig. 18 a plurality of disc-shaped magnetic circuits may be applied in the device shown in Fig. 13 to yield an increase in the driving couple as is shown in Fig. 28. To this end the supporting body 37 in Fig. 13 is replaced by a body 37'' similar to body 37' of Fig. 14 which shows a cylindrical part extending parallel to the axis of mechanism 31. To the innerwall of said cylindrical part, a plurality of disc shaped magnetic circuits of the kind denoted 33 in Fig. 13 are secured, and the shaft of the driving mechanism 32 passes through central holes of said magnetic circuits 33. Between each two of said magnetic circuits 33 a magnetic circuit 34 of the kind shown in Fig. 13 is arranged, said magnetic circuits 34 being secured on the shaft of the driven mechanism 32 and having an outer diameter smaller than the inner diameter of the cylindrical part of the supporting body 37''. Thus cooperation occurs between said plurality of magnetic circuits 33 and 34 to result in an increase of the driving couple.

Figure 14:
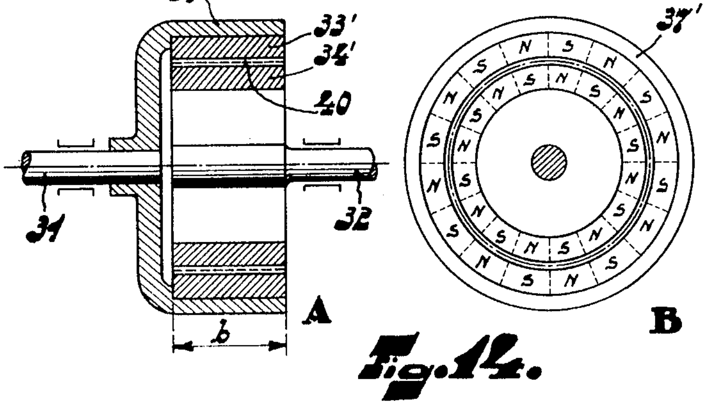

Fig. 19 shows a modification of the device shown in Fig. 14 in which the driving and driven mechanisms may be decoupled at will. Due to the strong attractive power between the two magnetic circuits 33' and 34', it is difficult to decouple the mechanisms 31 and 32 by a relative axial movement alone. Consequently, there is provided cylinders 53 and 54, each constituted by ferromagnetic material having low hysteresis losses. Upon an axial movement of the device 32 in the direction of the arrow, the ferro-magnetic ring 53 moves into a position opposite the magnetic circuit 33', and the magnetic circuit 34' moves into a position opposite the ferromagnetic ring 54 substantially reducing and effectively neutralizing the axial attractive power and thereby decoupling the two mechanisms.

Alternatively, the ferromagnetic ring 53 may be replaced by a magnetic circuit (not shown) rotating with a different speed of revolution so that a change in speed can be obtained.

The device shown in Fig. 20 is a further modification of the device shown in Fig. 14 in which a transmission ratio differing from 1 is obtained. In this case, the driving shaft 31 is mechanically connected to a cylindrical member 57 which supports an annular magnetic circuit 55 on its inner surface. The driven shaft 32 is provided with an annular magnetic circuit 56 cooperating with the circuit 55. The transmission ratio is simply the ratio of the number of poles on the magnetic circuit 55 to the number of poles on the magnetic circuit 56.

Fig. 21 shows still a further modification of Fig. 14 in which the magnet poles are not parallel to the shafts of the mechanisms 31 and 32, but oblique with respect thereto (Fig. 21B) in order to obtain a substantially constant driving force. Due to the curvature of the pole surfaces, this driving force is greater when the limit zone between two adjacent poles of one magnetic circuit is closest to the other magnetic circuit, rather than when the center of two co-operaing poles are closest to one another. With this arrangement, one point of a limit zone between two adjacent magnet poles of one magnetic circuit is now closest to the other circuit for the whole period of the movement.

Fig. 22A shows a device according to the invention in which the shafts of the two mechanisms 31 and 32 are at right angles to one another. By arranging the magnet poles of the magnetic circuits 62 and 63 at an angle of 45° to their associated shafts, a smooth transmission of movement is obtained. Moreover, by rearrangement of the shape of the two pole surfaces of the magnetic circuits 62 and 63, as is shown in Fig. 22B, the co-operating parts of these surfaces may be increased, with of course a corresponding increase in driving force.

Figs. 23A and B show a further method of transmission in which the shafts of the two mechanisms 31 and 32 are at right angles to one another. Pole surfaces 68 and 69 are provided on the mechanisms 31, 32 in a manner similar to that shown in Fig. 21B with oblique poles N and S, non-polarized zones C being provided between these poles in a similar manner to that shown in Fig. 16.

The devices shown in the preceding paragraphs also permit obtaining variable transmission ratios between the driving and driven mechanisms. For example, in the device shown in Fig. 17, the pole surface 44 of one mechanism may be provided with a second rim 71 of magnet poles (the poles of which are not shown) and when the mechanisms are displaced in a radial direction relative to one another, the poles of the pole surface 43 co-operate with this rim of poles 71 thereby obtaining a different transmission ratio between the two mechanisms. Similarly, the pole surface 44 (Fig. 17) may be replaced by that shown in Fig. 24, in which the pitch line has a spiralized course, thereby obtaining a substantially continuously varying transmission ratio. In such a case, by means of magnetic screening (not shown) the coupling between those poles of the magnetic circuits which would reduce the driving force would be interrupted. It may be also desirable to cause the pitch lengths of the poles shown in Fig. 24 in the various turns of the spiral to vary slightly.

A similar effect is obtained by replacing the pole surface 68 in the device shown in Fig. 23B by that shown in Fig. 24. Upon an axial displacement of the mechanism 32, the pole surface 69 of which must have a correspondingly smaller width *b*, a substantially continuously varying transmission ratio is obtained. If the mechanism 32 moves freely in an axial direction, the speed of revolution of the mechanism 32 will exhibit a continuous increase or decrease.

With the device shown in Fig. 25, a variable transmission ratio is obtained by providing the mechanisms 31 and 32 with a plurality of magnetic circuits 76, 77, 78, 79, of which the pole pairs 76 and 77 are shown cooperating with one another. By displacing the mechanism 32 in an axial direction, the coupling between these magnetic circuits 76 and 77 may be interrupted and a coupling between the magnetic circuits 78 and 79 established, so that the transmission ratio is appreciably varied. The axial force required to effect this displacement is kept small in a similar manner to that shown in Fig. 19 by providing ferromagnetic parts 80, 81, 82 and 83 in the proximity of the magnetic circuits 76, 77, 78, 79, these parts neutralizing the axial component of the magnetic attractive power of the magnetic circuits.

Fig. 26 shows a device combining the principal features of the device shown in Figs. 17 and 24, in which one mechanism 31 is associated with a cylindrical magnetic circuit 85 which cooperates with a magnetic circuit 86 associated with the other mechanism 32. The magnetic circuit 85 is provided with a number of poles having a width equal to the width *b* of the poles of the circuit 86, these poles being adjacent one another in rings or in a helix; in the latter case, the pitch line is a helical line. In a manner similar to that described with reference to Figs. 17 and 24, a substantially continuously varying transmission ratio may be obtained by a suitable variation of the pitch length (at right angles to the plane of the drawing) of the poles of the circuit 85.

Fig. 27 shows a transmission device having a ratio which is small relative to 1 comprising a disc-shaped magnetic circuit 88, associated with the driving mechanism 31, provided with spiralized poles and having radial pitch lines $T_1$ cooperating with substantially radial poles on a disc-shaped magnetic circuit 89 of the driven mechanism 32, part of which is screened by means of a thin ferromagnetic screening plate 90 having low hysteresis losses against the poles of the circuit 88. Thus, only the poles at the position of the air gap 1 will cooperate with one another; consequently, the speed of revolution of the driven mechanism 32 becomes only a fraction of that of the driving mechanism 31.

It will be obvious that the embodiments shown in Figs. 13 to 27 also permit converting a linear movement into a rotation, and conversely.

As stated beforehand, the permanent magnetic material constituting the magnetic circuits of the devices shown in the drawings must have a remanence inductance $B_r$ in Gauss that is not greater than four times the coercive field strength $_BH_c$ in Oersted: that is to say, the permanent magnetic material must comply with the following equation:

$$B_r(\text{Gauss}) \leqq 4\,_BH_c(\text{Oersted})$$

Magnetic materials fulfilling this requirement and suitable for application in the devices according to the invention are the permanent magnet materials which are fully described in British patent #708,127. These materials are characterized by a composition substantially consisting of non-cubic crystals consisting principally of a polyoxide of iron, an oxide of at least one of the metals barium, strontium and lead, and, if desired, a small amount of calcium. Such materials have, as only one example thereof, a remanent inductance $B_r$ of 2000 Gauss, a coercive field strength $_BH_c$ of 1800 Oersted, and a field strength of disappearance $_IH_c$ of 3000 Oersted.

While we have thus described our invention with specific examples and embodiments thereof, other modifications will be readily apparent to those skilled in the art without departing from the spirit and the scope of the invention as defined in the appended claims.

What we claim is:

1. A magnetic circuit for producing a magnetic field varying in polarity along a given pitch line comprising a body having adjacent portions of permanent magnetic material each having a thickness $d$ in a given direction perpendicular to said pitch line, said portions being magnetized in a direction parallel to said given direction thereby defining poles of alternate polarity on surfaces thereof parallel to said pitch line, said permanent magnetic material having a coercive field strength $_BH_c$ in Oersteds and a remanence inductance $B_r$ in Gauss, the ratio of $B_r$ to $_BH_c$ being less than 4:1, each of said adjacent portions having a pitch length $s$ measured along said given pitch line, said adjacent portions being spaced from one another a distance $x$ measured along said given pitch line, the parameters $s$, $x$ and $d$ having values at which $x$ is smaller than $0.7s$ and smaller than $2d$, and $d$ lies in the range between $0.15s$ and $s$.

2. A magnetic circuit as claimed in claim 1 in which $s$ is approximately equal to $2d$.

3. A magnetic circuit as claimed in claim 1 in which a ferromagnetic member magnetically interconnects all of the magnet poles on a side thereof remote from said given pitch line.

4. A magnetic circuit for producing a magnetic field varying in polarity along a given pitch line comprising a body of permanent magnetic material having a thickness $d$ in a given direction perpendicular to said pitch line, successive portions of said body being magnetized in a direction parallel to said given direction to provide poles of alternate polarity on a surface thereof parallel to said pitch line, said permanent magnetic material having a coercive field strength $_BH_c$ in Oersteds and a remanence inductance $B_r$ in Gauss, the ratio of $B_r$ to $_BH_c$ being less than 4:1, each of said portions having a pitch length $s$ measured along said given pitch line, the parameters $s$ and $d$ having values at which $d$ lies in the range between $0.15s$ and $s$.

5. A magnetic circuit as claimed in claim 4 in which the spacing between adjacent poles is less than $$\frac{d}{3}$$

6. A magnetic circuit as claimed in claim 4 in which the body is constituted by a plurality of stacked permanent magnet members each having identical poles in magnetic reinforcing relationship.

7. A magnetic apparatus for transmitting a mechanical movement comprising a driving and a driven mechanism each including a magnetic circuit for producing a magnetic field varying in polarity along a given circular pitch line comprising a flat disc-shaped body having adjacent portions of permanent magnetic material each having a thickness $d$ in a given direction perpendicular to said pitch line, said portions being magnetized in a direction parallel to said given direction thereby defining poles of alternate polarity on surfaces thereof parallel to said pitch line, said permanent magnet material having a coercive field strength $_BH_c$ in Oersteds and a remanence inductance $B_r$ in Gauss, the ratio of $B_r$ to $_BH_c$ being less than 4:1, each of said adjacent portions having a pitch length $s$ measured along said given pitch line, said adjacent portions being spaced from one another a distance $x$ measured along said given pitch line, the parameters $s$, $x$ anl $d$ having values at which $x$ is smaller than $0.7s$ and smaller than $2d$, and $d$ lies in the range between $0.15s$ and $s$, said disc shaped bodies of each of said mechanisms facing each other whereby mechanical motion is transmitted by the relative magnetic forces of the two magnetic circuits.

8. A magnetic apparatus for transmitting a mechanical movement as claimed in claim 7 in which the permanent magnetic material has a field strength of disappearance $_IH_c$ in Oersted exceeding the remanence inductance $B_r$ in Gauss.

9. A magnetic apparatus for transmitting a mechanical movement as claimed in claim 7 in which an electrically conductive member is joined to one of the mechanisms in proximity to the magnetic circuit of the other mechanism to produce a driving couple by eddy currents.

10. A magnetic apparatus for transmitting a mechanical movement as claimed in claim 7 in which non-polarized zones are provided between the magnetic poles of each of the magnetic circuits, the non-polarized zones widening outwardly from the circular pitch line in a direction at right angles to the circular pitch line.

11. A magnetic apparatus for transmitting a mechanical movement as claimed in claim 7 in which at least one of said mechanisms includes a magnetic circuit comprising a plurality of flat disc-shaped bodies.

12. A magnetic apparatus for transmitting a mechanical movement as claimed in claim 7 in which one of said magnetic circuits comprises a pair of flat disc-shaped bodies disposed on opposite sides of the body of the other of said magnetic circuits.

13. A magnetic apparatus for transmitting a mechanical movement comprising a driving and a driven mechanism each including a magnetic circuit for producing a magnetic field varying in polarity along a given pitch line comprising a flat disc-shaped body having adjacent portions of permanent magnetic material each having a thickness $d$ in a given direction perpendicular to said pitch line, one of said mechanisms having a spiral pitch line, said portions being magnetized in a direction parallel to said given direction thereby defining poles of alternate polarity on surfaces thereof parallel to said pitch line, said permanent magnetic material having a coercive field strength $_BH_c$ in Oersteds and a remanence inductance $B_r$ in Gauss, the ratio of $B_r$ to $_BH_c$ being less than 4:1, each of said adjacent portions having a pitch length $s$ measured along said given pitch line, said adjacent portions being spaced from one another a distance $x$ measured along said given pitch line, the parameters $s$, $x$ and $d$ having values at which $x$ is smaller than $0.7s$ and smaller than $2d$, and $d$ lies in the range between $0.15s$ and $s$, said disc-shaped bodies of each of said mechanisms facing each other whereby mechanical movement is transmitted by the relative magnetic forces of the two magnetic circuits.

14. A magnetic apparatus for transmitting a mechanical movement as claimed in claim 13 in which means are provided for varying the transmission ratio by displacing the magnetic circuits relative to one another.

15. A magnetic apparatus for transmitting a mechanical movement as claimed in claim 13 in which a magnetic screening member is provided between the magnetic circuits at a position to reduce undesired magnetic forces.

16. A magnetic apparatus for transmitting a mechanical movement comprising a driving and a driven mechanism and each including a magnetic circuit for producing a magnetic field varying in polarity along a given pitch line, one of said circuits comprising a flat disc-shaped body and the other of the magnetic circuits comprising a cylindrical body, each body having adjacent portions of permanent magnetic material having a thickness $d$ in a given direction perpendicular to said pitch line, said portions being magnetized in a direction parallel to said given direction thereby defining poles of alternate polarity on surfaces thereof parallel to said pitch line, said permanent magnetic material having a coercive field strength $_BH_c$ in Oersteds and a remanence inductance $B_r$ in Gauss, the ratio of $B_r$ to $_BH_c$ being less than 4:1, each of said adjacent portions having a pitch length $s$ measured along said given pitch line, said adjacent portions being spaced from one another a distance $x$ measured along said given pitch line, the parameters $s$, $x$ and $d$ having values at which $x$ is smaller than $0.7s$ and smaller than $2d$, and $d$ lies in the range between $0.15s$ and $s$, said bodies being being in positions at which a movement of one mechanism is transmitted to the other mechanism by the relative magnetic forces.

17. A magnetic apparatus for transmitting a mechanical movement as claimed in claim 16 in which the magnetic portions are at an angle with respect to the pitch line.

18. A magnetic apparatus for transmitting a mechanical movement as claimed in claim 16 in which the mechanisms are mounted on shafts disposed at right angles to one another.

19. A magnetic circuit for producing a magnetic field varying in polarity along a given longitudinal pitch line comprising a flat body having a plurality of adjacent portions of permanent magnetic material each having a thickness $d$ in a given direction perpendicular to said pitch line, said portions being alternately magnetized in a direction parallel to said given direction thereby defining poles of alternate polarity on surfaces thereof parallel to said pitch line, said permanent magnetic material having a coercive field strength $_BH_c$ in Oersteds and a remanence inductance $B_r$ in Gauss, the ratio of $B_r$ to $_BH_c$ being less than 4:1, each of said adjacent portions having a pitch length $s$ measured along said given pitch line, said adjacent portions being spaced from one another a distance $x$ measured along said given pitch line, the parameters $s$, $x$ and $d$ having values at which $x$ is smaller than $0.7s$ and smaller than $2d$, and $d$ lies in the range between $0.15s$ and $s$.

20. A magnetic apparatus as claimed in claim 19 for demagnetization of a magnetic member in which the field strength components of the magnetic circuit occurring between the poles and measured parallel to the pitch line decreases gradually in value.

21. A magnetic apparatus as claimed in claim 20 in which the greatest of the field strength components is at least 600 Oersteds.

22. A magnetic apparatus as claimed in claim 19 comprising two members, each including said magnetic circuit in an alternating arrangement.

23. A magnetic apparatus constituted by a magnetic circuit for producing a magnetic field varying in polarity along a given circular pitch line comprising a cylindrical body having adjacent portions of permanent magnetic material each having a thickness $d$ in a given direction perpendicular to said pitch line, said portions being magnetized in a direction parallel to said given direction thereby defining poles of alternate polarity on surfaces thereof parallel to said pitch line, said permanent magnetic material having a coercive field strength $_BH_c$ in Oersteds and a remanence inductance $B_r$ in Gauss, the ratio of $B_r$ to $_BH_c$ being less than 4:1, each of said adjacent portions having a pitch length $s$ measured along said given pitch line, said adjacent portions being spaced from one another a distance $x$ measured along said given pitch line, the parameters $s$, $x$ and $d$ having values at which $x$ is smaller than $0.7s$ and smaller than $2d$, and $d$ lies in the range between $0.15s$ and $s$.

24. A magnetic apparatus as claimed in claim 23 for producing the permanent magnetic field for an electrical multipole machine in which the permanent magnetic material has a coercive field strength $_BH_c$ of more than 750 Oersteds and a field strength of disappearance $_IH_c$ of more than 1.2 times $_BH_c$.

25. A magnetic apparatus as claimed in claim 23 for the transmission of movement comprising a driving and driven mechanism each including said magnetic circuit, in which ferromagnetic members affixed to one mechanism are arranged in proximity to the magnetic circuit of the other mechanism whereby the mechanisms can be decoupled.

26. A magnetic apparatus as claimed in claim 23 in which the magnetic poles are at an angle to the axis of the cylindrical body.

27. A magnetic apparatus as claimed in claim 26 in which the mechanisms are each mounted on a shaft, the shafts being at right angles to one another.

References Cited in the file of this patent

UNITED STATES PATENTS

| | | |
|---|---|---|
| 750,009 | Thordon | Jan. 19, 1904 |
| 2,485,474 | Brainard | Oct. 18 ,1949 |
| 2,516,901 | Morrill | Aug. 1, 1950 |
| 2,603,678 | Helmer | July 15, 1952 |

FOREIGN PATENTS

| | | |
|---|---|---|
| 577,193 | Great Britain | May 8, 1946 |
| 592,048 | France | Apr. 23, 1925 |